US007062496B2

(12) United States Patent
Dettinger et al.

(10) Patent No.: US 7,062,496 B2
(45) Date of Patent: Jun. 13, 2006

(54) AUTOMATIC DATA ABSTRACTION GENERATION USING DATABASE SCHEMA AND RELATED OBJECTS

(75) Inventors: Richard D. Dettinger, Rochester, MN (US); Frederick A. Kulack, Rochester, MN (US); Richard J. Stevens, Mantorville, MN (US); Eric W. Will, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 10/365,296

(22) Filed: Feb. 12, 2003

(65) Prior Publication Data

US 2004/0162832 A1    Aug. 19, 2004

(51) Int. Cl.
*G06F 17/30* (2006.01)
(52) U.S. Cl. ........................................ 707/100; 707/203
(58) Field of Classification Search ............. 707/1–10, 707/100–104.1, 200–205
See application file for complete search history.

(56) References Cited

U.S. PATENT DOCUMENTS

| 6,272,488 B1 * | 8/2001 | Chang et al. ............ 707/4 |
| 6,725,227 B1 | 4/2004 | Li | |
| 2004/0148278 A1 * | 7/2004 | Milo et al. ............ 707/3 |

\* cited by examiner

*Primary Examiner*—Mohammad Ali
(74) *Attorney, Agent, or Firm*—Patterson & Sheridan, LLP

(57) ABSTRACT

The present invention generally is directed to a system, method and article of manufacture for generating a data repository abstraction (DRA) component that may be used to access data independent of the particular manner in which the data is physically represented. In one embodiment, a DRA generator identifies a set of logical field candidates for possible use in generating the DRA component. The DRA generator may then generate the DRA component with a subset of the logical field candidates determined by a weighting algorithm based on usage information collected from available database schema and associated objects.

17 Claims, 7 Drawing Sheets

AUTOMATIC DATA ABSTRACTION GENERATION USING DATABASE SCHEMA AND RELATED OBJECTS

BACKGROUND OF THE INVENTION

1. Field of the Invention

The present invention generally relates to data processing and more particularly to accessing data independent of the particular manner in which the data is physically represented.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One of the issues faced by data mining and database query applications, in general, is their close relationship with a given database schema (e.g., a relational database schema). This relationship makes it difficult to support an application as changes are made to the corresponding underlying database schema. Further, the migration of the application to alternative underlying data representations is inhibited. In today's environment, the foregoing disadvantages are largely due to the reliance applications have on SQL, which presumes that a relational model is used to represent information being queried. Furthermore, a given SQL query is dependent upon a particular relational schema since specific database tables, columns and relationships are referenced within the SQL query representation. As a result of these limitations, a number of difficulties arise.

One difficulty is that changes in the underlying relational data model require changes to the SQL foundation that the corresponding application is built upon. Therefore, an application designer must either forgo changing the underlying data model to avoid application maintenance or must change the application to reflect changes in the underlying relational model. Another difficulty is that extending an application to work with multiple relational data models requires separate versions of the application to reflect the unique SQL requirements driven by each unique relational schema. Yet another difficulty is evolution of the application to work with alternate data representations because SQL is designed for use with relational systems. Extending the application to support alternative data representations, such as XML, requires rewriting the application's data management layer to use non-SQL data access methods.

A typical approach used to address the foregoing problems is software encapsulation. Software encapsulation involves using a software interface or component to encapsulate access methods to a particular underlying data representation. An example is found in the Enterprise JavaBean (EJB) specification that is a component of the Java 2 Enterprise Edition (J2EE) suite of technologies. In accordance with the EJB specification, entity beans serve to encapsulate a given set of data, exposing a set of Application Program Interfaces (APIs) that can be used to access this information. This is a highly specialized approach requiring the software to be written (in the form of new entity EJBs) whenever a new set of data is to be accessed or when a new pattern of data access is desired. The EJB model also requires a code update, application built and deployment cycle to react to reorganization of the underlying physical data model or to support alternative data representations. EJB programming also requires specialized skills, since more advanced Java programming techniques are involved. Accordingly, the EJB approach and other similar approaches are rather inflexible and costly to maintain for general-purpose query applications accessing an evolving physical data model.

Another shortcoming of the prior art, is the manner in which information can be presented to the user. A number of software solutions support the use of user-defined queries, in which the user is provided with a "query-building" tool to construct a query that meets the user's specific data selection requirements. In an SQL-based system, the user is given a list of underlying database tables and columns to choose from when building the query. The user must decide which tables and columns to access based on the naming convention used by the database administrator, which may be cryptic, at best. Further, while the number of tables and columns presented to the user may be vast, only a limited subset may actually be of interest. In other words, nonessential content is revealed to the end user, which may make it difficult to build a desired query, as the nonessential content is filtered out by the user.

Therefore, there is a need for an improved and more flexible method for presenting, to a user, a limited subset of all possible fields to choose from when building a query. Preferably, the limited subset will only include fields of interest to the user.

SUMMARY OF THE INVENTION

The present invention generally provides methods, articles of manufacture and systems for generating abstract representations of fields of a data repository.

For some embodiments, a method for automatically generating abstract representations of one or more fields of a data source generally includes collecting information regarding usage of the fields and generating the abstract representations based on the collected usage information.

For some embodiments, a method for automatically generating a data repository abstraction component describing, and used to access, data in a data repository generally includes collecting information regarding schema of the data repository, generating a list of logical field candidates for potential use in the data repository abstraction component based on the collected information regarding the schema, the logical field candidates having a set of corresponding weights, collecting information regarding usage of the data, adjusting the weights according to the collected information regarding usage of the data, and adding to the data repository abstraction component definitions for logical field candidates having corresponding weights above a predetermined threshold value.

For some embodiments, the article of manufacture generally includes a computer-readable medium containing a program which, when executed by a processor, performs operations for automatically generating a data repository abstraction component describing, and used to access, data in a data repository. The operations generally include collecting information regarding the data and usage of the data and generating the data repository abstraction component based on the collected information.

For some embodiments, the system generally includes a repository of data, metadata regarding a schema of the repository of data, one or more objects including at least one of an index and an application object, and a data repository abstraction generator. The data repository abstraction generator is generally configured to generate a data repository abstraction component describing, and used to access, data in the data repository based on the metadata and information collected from the one or more objects.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
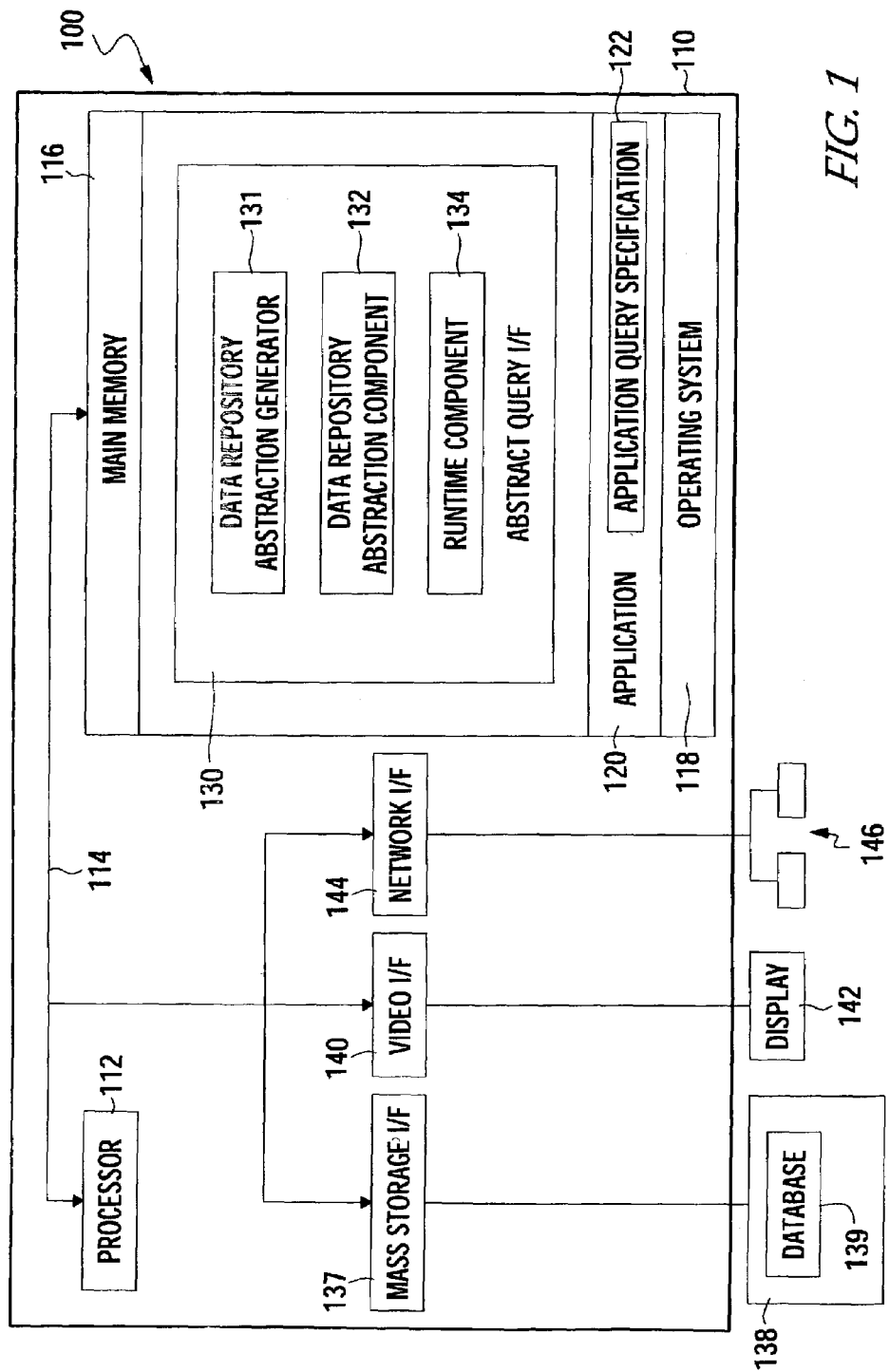
FIG. 1 is a computer system illustratively utilized in accordance with the present invention.

The present invention generally is directed to methods, articles of manufacture, and systems for automatically generating abstract representations (hereinafter referred to as logical field specifications) of fields contained in a data repository. In some embodiments, logical field specifications may be grouped in a data repository abstraction (DRA) component that serves as a data definition framework allowing data to be accessed from the data repository independent of the particular manner (e.g., SQL, XML, etc.) in which the data is physically represented. For some embodiments, the logical field specifications may be generated based on collected information regarding a schema of the data repository and related objects, such as primary and foreign keys, indexes, and applications objects.

As used herein, the term field (also commonly referred to as an entity) generally refers to any object about which data can be stored. Accordingly, the exact form of a field may depend on the particular physical data representation of the underlying data source. For example, in a relational data representation, a field commonly takes the form of a column in a table.

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Referring now to FIG. 1, a computing environment 100 is shown. In general, the distributed environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries 400 available from International Business Machines of Armonk, N.Y.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., direct access storage device 138) or on another computer coupled to the computer system 110 via bus 114.

The memory 116 is shown configured with an operating system 118. The operating system 118 is the software used for managing the operation of the computer system 100. Examples of the operating system 118 include IBM OS/400®, UNIX, Microsoft Windows®, and the like.

The memory 116 further includes one or more applications 120 and an abstract query interface 130. The applications 120 and the abstract query interface 130 are software products comprising a plurality of instructions that are resident at various times in various memory and storage devices in the computer system 100. When read and executed by one or more processors 112 in the computer system 100, the applications 120 and the abstract query interface 130 cause the computer system 100 to perform the steps necessary to execute steps or elements embodying the various aspects of the invention. The applications 120 (and more generally, any requesting entity, including the operating system 118) are configured to issue queries against a database 139 (shown in storage 138). The database 139 is representative of any collection of data regardless of the particular physical representation. By way of illustration, the database 139 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The queries issued by the applications 120 are defined according to an application query specification 122 included with each application 120. The queries issued by the applications 120 may be predefined (i.e., hard coded as part of the applications 120) or may be generated in response to input (e.g., user input). In either case, the queries (referred to herein as "abstract queries") are composed using logical fields defined by the abstract query interface 130. In particular, the logical fields used in the abstract queries are defined (or specified) by a DRA component 132 of the abstract query interface 130. Thus, the DRA component 132 may be regarded as a data definition framework, which may be accessed when executing an abstract query against the database 139. For example, the abstract queries may be executed by a runtime component 134 which transforms the abstract queries into a form consistent with the physical representation of the data contained in the database 139, based on the logical field definitions (or specifications) in the DRA component 132.

In an effort to facilitate the transition from a conventional (physical) data model to an abstract data model, the DRA component 132 may be automatically generated by a DRA generator 131. As will be described in greater detail below, the DRA generator 131 may be generally configured to identify a set of logical field candidates from existing database schema, and populate the DRA component 132 with a limited subset of the identified logical field candidates based on usage information collected from the database schema and related objects.

Prior to describing the DRA generator 133, however, the application query specification 122 and the abstract query interface 130 are further described with reference to FIGS. 2A–B, which show an illustrative relational view 200 of components of the invention according to one embodiment. To provide a perspective to the following description, the DRA component 132 may be generated using methods of the present invention. Of course, the abstract data model illustrated in the relational view 200 is exemplary of just one type of abstract data model, the transition to which may be facilitated by techniques of the present invention. It will be appreciated by those skilled in the art that the abstract representations of physical fields automatically generated in accordance with the present invention may be utilized in a number of ways.

Figure 2A:
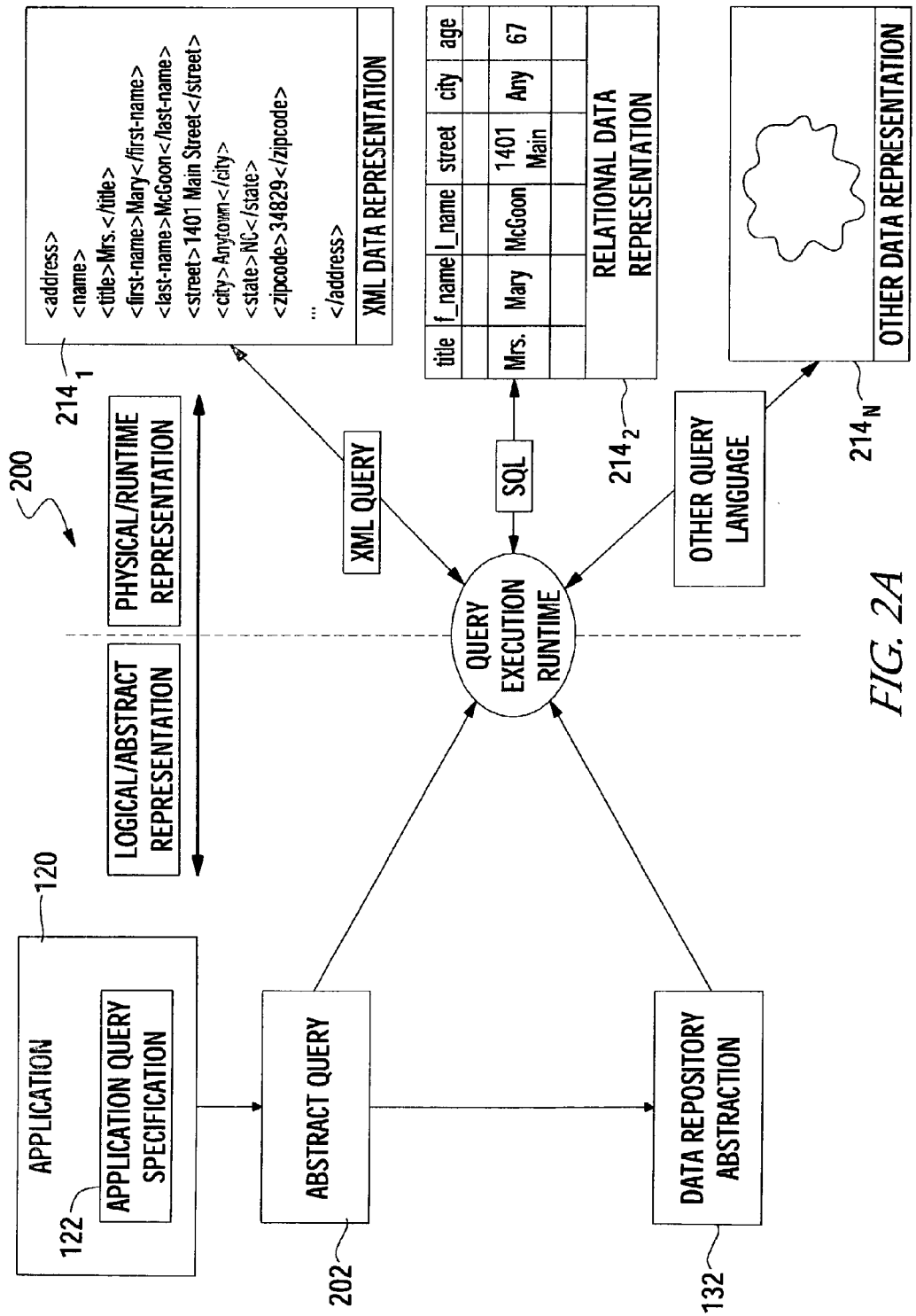
FIG. 2A is a relational view of software components, including a data repository abstraction component, of one embodiment of the present invention.
Figure 2B:
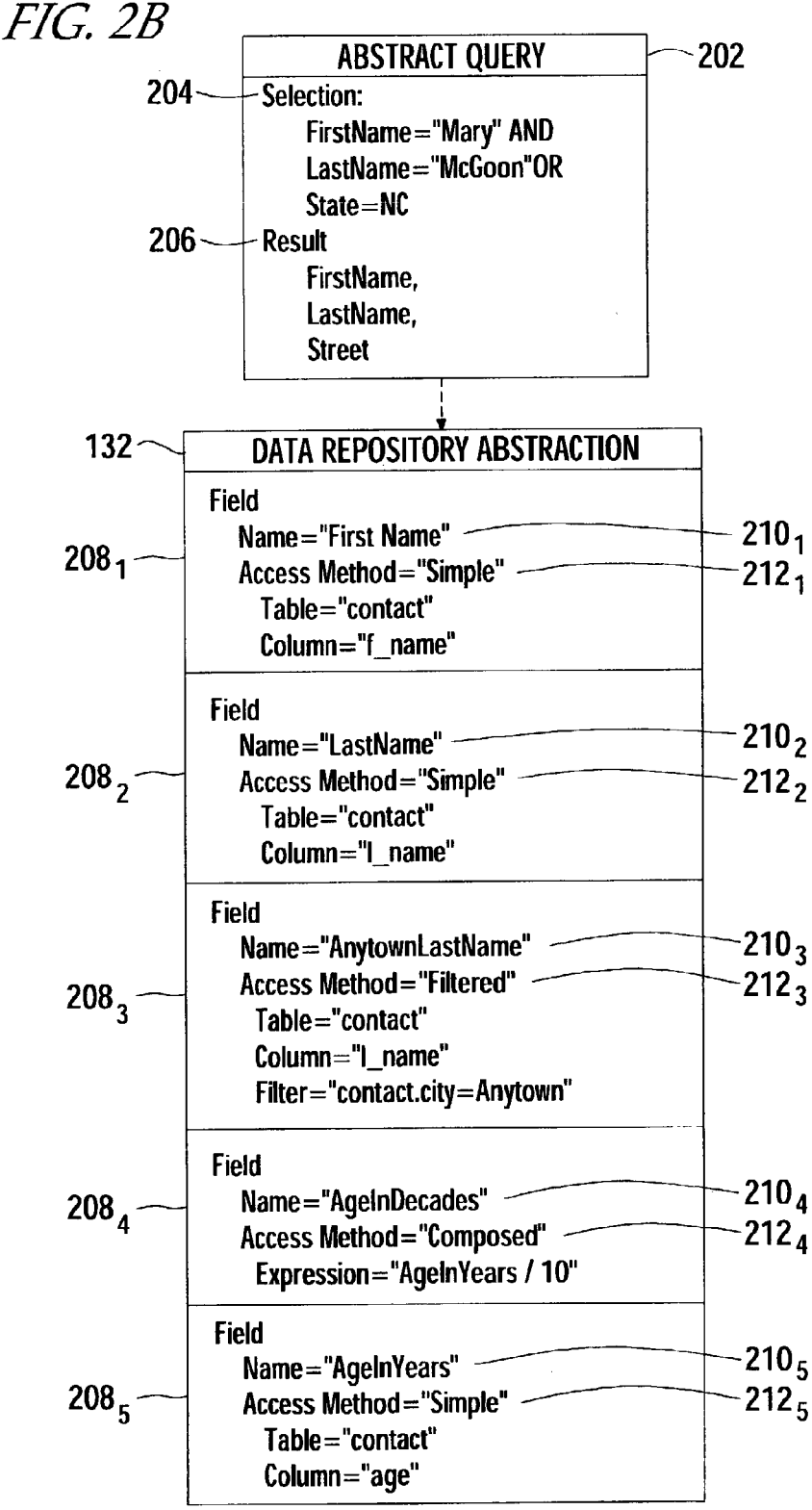
FIG. 2B illustrates an exemplary abstract query and data repository abstraction component according to one embodiment of the present invention.

Referring now to FIG. 2A, the requesting entity (e.g., one of the applications 120) issues a query 202 as defined by the respective application query specification 122 of the requesting entity. The resulting query 202 is generally referred to herein as an "abstract query" because the query is composed according to abstract (i.e., logical) fields rather than by direct reference to the underlying physical data entities in the database 139. As a result, abstract queries may be defined that are independent of the particular underlying data representation used. In one embodiment, the application query specification 122 may include both criteria used for data selection (selection criteria 204) and an explicit specification of the fields to be returned (return data specification 206) based on the selection criteria 204.

The logical fields specified by the application query specification 122 and used to compose the abstract query 202 are defined by the DRA component 132. In general, the DRA component 132 exposes information as a set of logical fields that may be used within a query (e.g., the abstract query 202) issued by the application 120 to specify criteria for data selection and specify the form of result data returned from a query operation. The logical fields are defined independently of the underlying data representation being used in the database 139, thereby allowing queries to be formed that are loosely coupled to the underlying data representation.

In general, the DRA component 132 comprises a plurality of field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification comprises a logical field name $210_1$, $210_2$, $210_3$, $210_4$, $210_5$ (collectively, field name 210) and an associated access method $212_1$, $212_2$, $212_3$, $212_4$, $212_5$ (collectively, access method 212). The access methods associate (i.e., map) the logical field names to a particular physical data representation $214_1$, $214_2$... $214_N$ in a database (e.g., database 139). By way of illustration, two data representations are shown, an XML data representation $214_1$ and a relational data representation $214_2$. However, the physical data representation $214_N$ indicates that any other data representation, known or unknown, is contemplated. In one embodiment, a single DRA component 132 contains field specifications (with associated access methods) for two or more physical data representations 214. In an alternative embodiment, a different single DRA component 132 is provided for each separate physical data representation 214.

Any number of access methods are contemplated depending upon the number of different types of logical fields to be supported. In one embodiment, access methods for simple fields, filtered fields and composed fields are provided. The field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("FirstName") to a column named "f_name" in a table named "contact". The field specification $208_3$ exemplifies a filtered field access method $212_3$. Filtered fields identify an associated physical entity and provide rules used to define a particular subset of items within the physical data representation. An example is provided in FIG. 2B in which the filtered field access method $212_3$ maps the logical field name $210_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information which does not exist in the underlying data representation may be computed. In the example illustrated in FIG. 2B the composed field access method $212_3$ maps the logical field name $210_3$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 208 of the DRA component 132 shown in FIG. 2 are representative of logical fields mapped to data represented in the relational data representation $214_2$. However, other instances of the DRA component 132 map logical fields to other physical data representations, such as XML.

An illustrative abstract query corresponding to the abstract query 202 shown in FIG. 2 is shown in Table I below. By way of illustration, the abstract query 202 is defined using XML. However, any other language may be used to advantage.

TABLE I

QUERY EXAMPLE

| | |
|---|---|
| 001 | <?xml version="1.0"?> |
| 002 | <!--Query string representation: (FirstName = "Mary" AND LastName = |
| 003 | "McGoon") OR State = "NC"--> |
| 004 | <QueryAbstraction> |
| 005 |   <Selection> |
| 006 |     <Condition internalID="4"> |
| 007 |       <Condition field="FirstName" operator="EQ" value="Mary" |
| 008 | internalID="1"/> |
| 009 |       <Condition field="LastName" operator="EQ" value="McGoon" |
| 010 | internalID="3" relOperator="AND"></Condition> |
| 011 |     </Condition> |
| 012 |     <Condition field="State" operator="EQ" value="NC" internalID="2" |
| 013 | relOperator="OR"></Condition> |
| 014 |   </Selection> |
| 015 |   <Results> |
| 016 |         <Field name="FirstName"/> |
| 017 |         <Field name="LastName"/> |
| 018 |         <Field name="State"/> |
| 019 |   </Results> |
| 020 | </QueryAbstraction> |

Illustratively, the abstract query shown in Table I includes a selection specification (lines 005–014) containing selection criteria and a results specification (lines 015–019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative DRA representation corresponding to the DRA 132 shown in FIG. 2 is shown in Table II below. By way of illustration, the DRA representation shown below is defined using XML. However, any other language may be used to advantage.

TABLE II

DATA REPOSITORY ABSTRACTION EXAMPLE

```
001    <?xml version="1.0"?>
002    <DataRepository>
003        <Category name="Demographic">
004            <Field queryable="Yes" name="FirstName"
                    displayable="Yes">
005                <AccessMethod>
006                    <Simple columnName="f_name"
                            tableName="contact"></Simple>
007                </AccessMethod>
008                <Type baseType="char"></Type>
009            </Field>
010            <Field queryable="Yes" name="LastName"
                    displayable="Yes">
011                <AccessMethod>
012                    <Simple columnName="l_name"
                            tableName="contact"></Simple>
013                </AccessMethod>
014                <Type baseType="char"></Type>
015            </Field>
016            <Field queryable="Yes" name="State"
                    displayable="Yes">
017                <AccessMethod>
018                    <Simple columnName="state"
                            tableName="contact"></Simple>
019                </AccessMethod>
020                <Type baseType="char"></Type>
021            </Field>
022        </Category>
023    </DataRepository>
```

Data Repository Abstraction Generation

Figure 3:
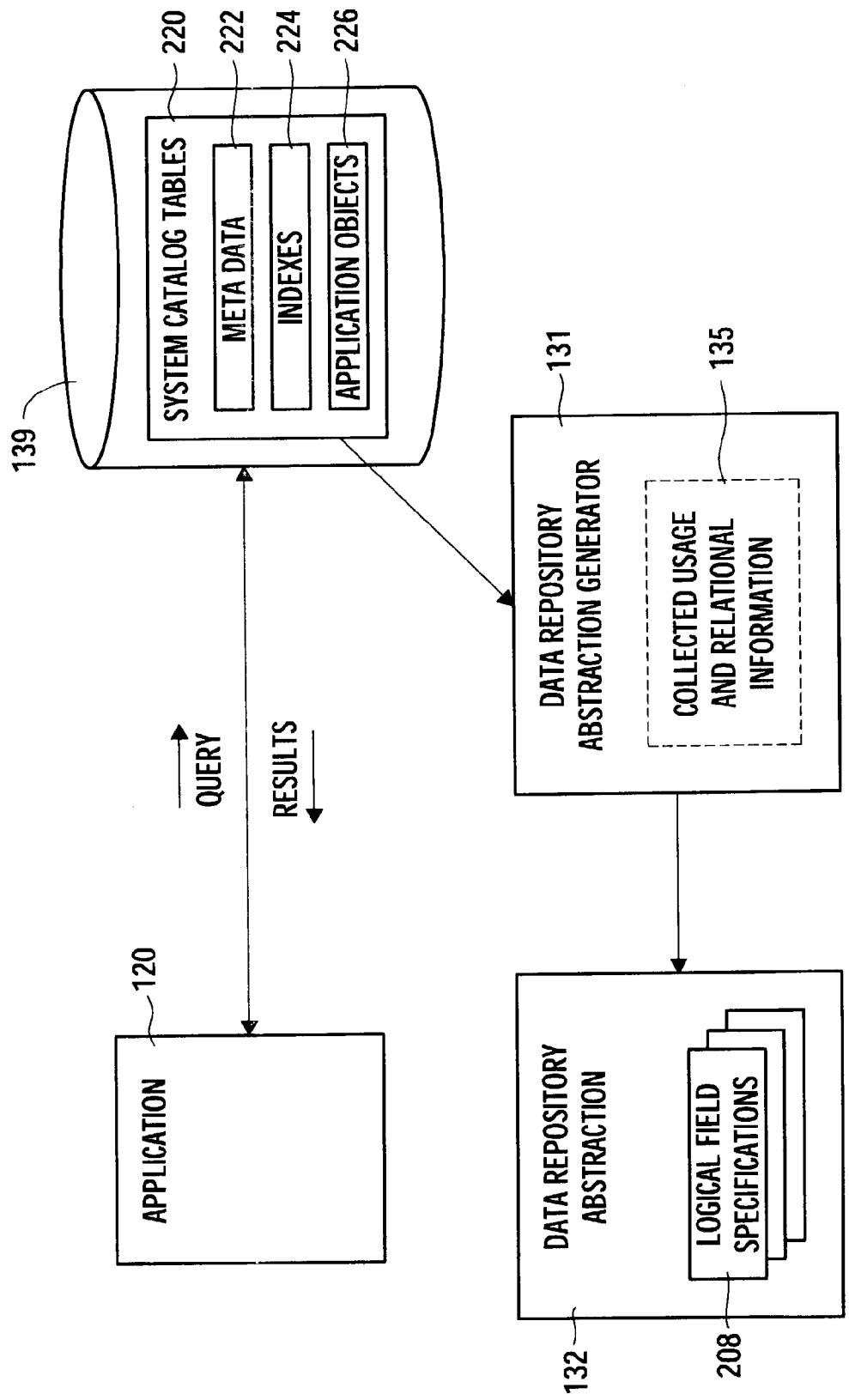
FIG. 3 is a relational view of software components, including a data repository abstraction generator, of one embodiment of the present invention.

As previously described, in an effort to facilitate the transition from a conventional data model to an abstract data model, the DRA component 132 may be automatically generated by the DRA generator 131. FIG. 3 is a relational view illustrating how the DRA generator 131 may generate the DRA component 132 by automatically generating logical field specifications 208 based on available database schema of a conventional database system comprising an application 120 configured to query a database 139 in a conventional manner.

Figure 4:
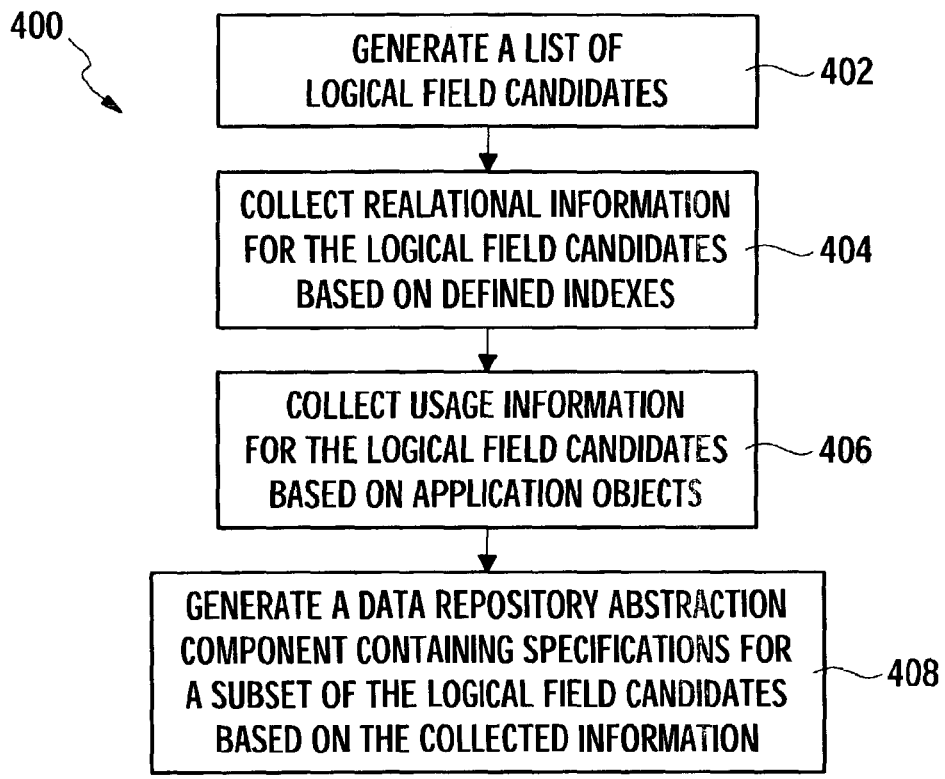
FIG. 4 is a flow chart illustrating exemplary operations for generating a data repository abstraction component according to aspects of the present invention.

Operation of the DRA generator 131 may be described with reference to FIG. 4, which is a flow diagram illustrating exemplary operations 400 for automatically generating the DRA component 132. Each of the operations (402–408) will be described in greater detail in corresponding flow diagrams of FIGS. 5–8. While the term field may generally refer to any type database attribute that may store a single data item related to a database object, to facilitate discussion, the following description will make reference to columns, as a specific, but not limiting, example of a field.

The operations 400 begin at step 402, by generating a list of logical field candidates. The logical field candidates may include every possible physical field (e.g., a column) from the database 139. The logical field candidates may be readily available as one type of metadata 222 available from system catalog tables 220 of the database 139. However, generating an abstract logical field for each of the physical fields of the database 139 may be undesirable, as only a small percentage of the fields may actually be of interest. Accordingly, presenting a user with a logical field for each of the physical fields would provide little benefit over the physical model.

Therefore, the DRA generator 131 may proceed to limit, based on various types of collected information, which of the logical field candidates are to be used to populate the DRA component 132 (hence, the classification as "candidates"). For example, at step 404, relational information for the logical field candidates is collected based on defined indexes 224. At step 406, usage information for the logical field candidates is collected based on application objects 226. Examples of application objects include, but are not limited to, triggers, stored procedures, and user defined functions. Finally, at step 408, the DRA component 132 containing specifications for a limited subset of the logical field candidates is generated.

Figure 5:
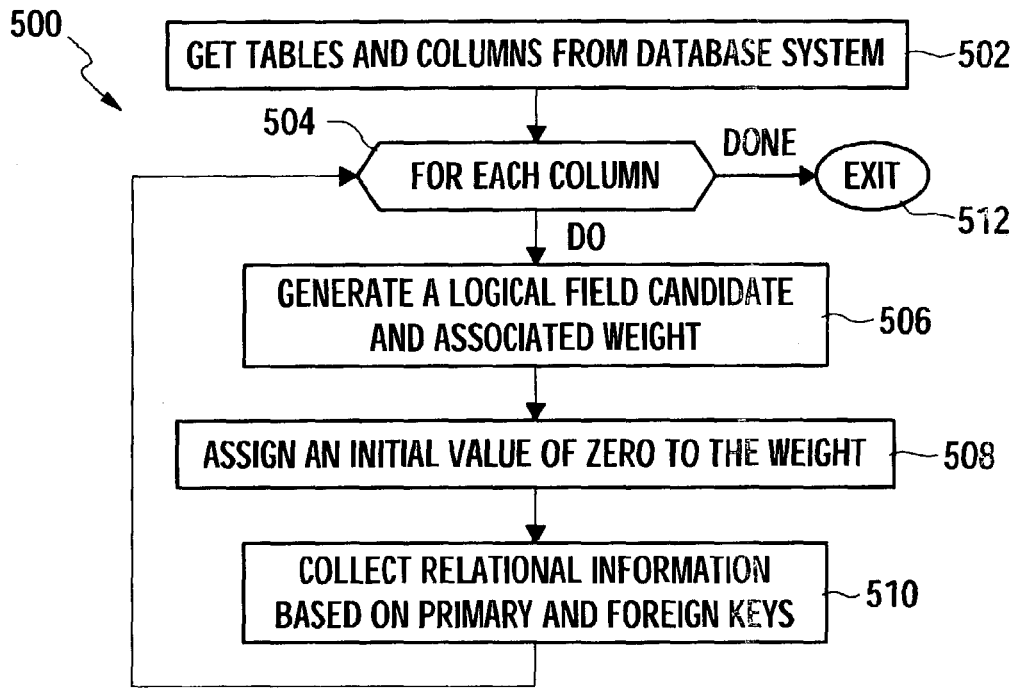
FIG. 5 is a flow chart illustrating exemplary operations for generating a list of logical field candidates according to aspects of the present invention.

FIG. 5 illustrates exemplary operations 500 which may be performed by the DRA generator 131 for generating the list of logical field candidates. At step 502, the DRA generator 131 gets a list of all available tables and columns from the database 139. The list of available tables and columns may be obtained using any suitable techniques, such as using a common call level interface to query the database 139. Examples of common call level interfaces include the Open Database Connectivity (ODBC) and Java Database Connectivity (JDBC™) call level interfaces. Accordingly, the list of tables and columns may be extracted from metadata 222 obtained through JDBC DatabaseMetaData calls, such as a getTables( ) and getColumns( ) methods.

At step 504, a loop of operations (506–510) is performed for each column to generate and initialize a set of logical field candidates. For example, at step 506, a logical field candidate and an associated weight is generated for a column (the weight may be regarded as a usage parameter to track usage of the column relative to other columns). At step 508, the weight is assigned an initial value of zero. The weight may be used to indicate the relative usage of the logical field candidate, and may be updated (e.g., increased from the initial value of zero) based on subsequently collected usage and relational information for the column. For example, when generating the DRA component 132, the DRA generator 131 may compare a weight against a threshold value to determine if the associated logical field candidate should be included in the DRA component 132.

At step 510, relational information for the column and associated logical field candidate is collected based on primary and foreign keys. In general, a primary key of a relational table uniquely identifies each record in the table. A foreign key is a field in a relational table that refers to the primary key column of another table. Accordingly, foreign keys may be used to identify relationships between tables. Primary and foreign keys are another example of information that may be gathered from metadata 222. Once the operations 506–510 have been performed for each column, the operations 500 are exited at step 512, for example, to return to a main routine of operations 400 and begin collecting additional information about the generated logical field candidates.

Figure 6:
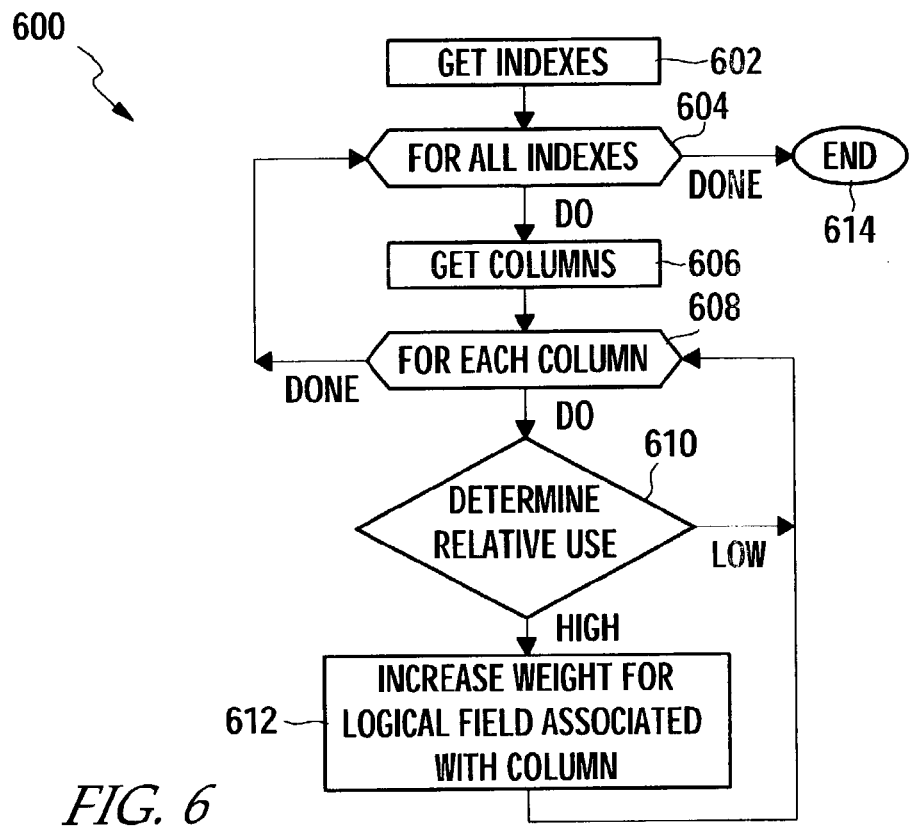
FIG. 6 is a flow chart illustrating exemplary operations for collecting information regarding logical field candidates from indexes according to aspects of the present invention.

FIG. 6 illustrates exemplary operations 600 which may be performed by the DRA generator 131 for collecting relational information for the logical field candidates based on defined indexes 224. As illustrated in FIG. 3, indexes 224 may be available in the system catalog tables 220. In general, an index is a database feature used for locating data quickly within a table. Indexes are typically defined by selecting commonly searched and/or commonly returned columns from a table. Accordingly, index definitions may provide useful information about usage of the logical field candidates. For example, the fact that a column is referenced within an index may indicate the column is frequently used. Further, the ordinal position of the column within the index it may indicate whether the column is referenced only as join criteria, if the column is likely to be used for searching based on a value, or if a value from the column is more likely to be returned (but not necessarily searched).

The operations 600 begin at step 602 by retrieving (getting) the indexes. At step 604, a loop of operations (606–612) is performed for each index. For step 606, a list of columns referenced by a selected index is obtained. At step 608, a loop is entered, in which the relative use of each referenced column is determined at step 610. As an example, relative use of the column may be determined to be high or low based on considerations described above (is the column likely to be searched, returned as a result, etc.). If the relative use of the column is determined to be high, the weight for the logical field candidate associated with the column is increased at step 612. Otherwise, the associated weight is not increased, and processing proceeds directly to step 608 to get the next column.

It should be noted that, since a column may be referenced by more than one index, the operation of step 612 may be additive. In other words, the weight for the logical field may be increased each time the relative use of the column within a selected index is determined to be high. On the other hand, for some embodiments, one or more indexes may be excluded from the weighting process. For example, there may be some indexes (e.g., used for background-type database operations) that do not provide information regarding the data that would be queried and may, therefore, be excluded. Regardless, once each column in an index is processed, the next index is selected at step 604. Once the operations of steps 606–612 have been performed for each index, the operations 600 are exited at step 614.

As an alternative to the order of steps illustrated above, the determination of step 610 may be made outside the loop of operations performed for each index. For example, the loop of operations for each index may determine which columns are referenced and a corresponding weight value may be increased each time a column is referenced. The determination of step 610 may then involve examining the increased value to determine how many times a column was referenced within an index. Regardless of the particular steps or order of steps, however, after the operations 600 are performed, the logical field weights should be adjusted according to relational information available from the indexes 224.

Additional information regarding usage of the logical field candidates may be collected by examination of application objects 226. As previously described, application objects 226 may include triggers, stored procedures, user defined functions, and the like. The logic within these types of objects may be indicative of various characteristics of the columns. For example, the logic within these types of objects, such as a trigger, may identify the existence of other actions, possibly involving other columns, that occur when the column is updated. This type of information regarding relationships between columns may not be found through examination of the underlying database schema alone.

The logic within application objects may also identify columns that are used mostly for reading, as opposed to those that are written to, within the application object, as well as information regarding the type of data associated with the column. For example, case statement logic within an application object that fills in one value for each branch of the statement may indicate a small number of values are associated with the column. Further, output modifiers that transform returned values may also indicate the type of access methods that may be used within the logical field to access the column.

Figure 7:
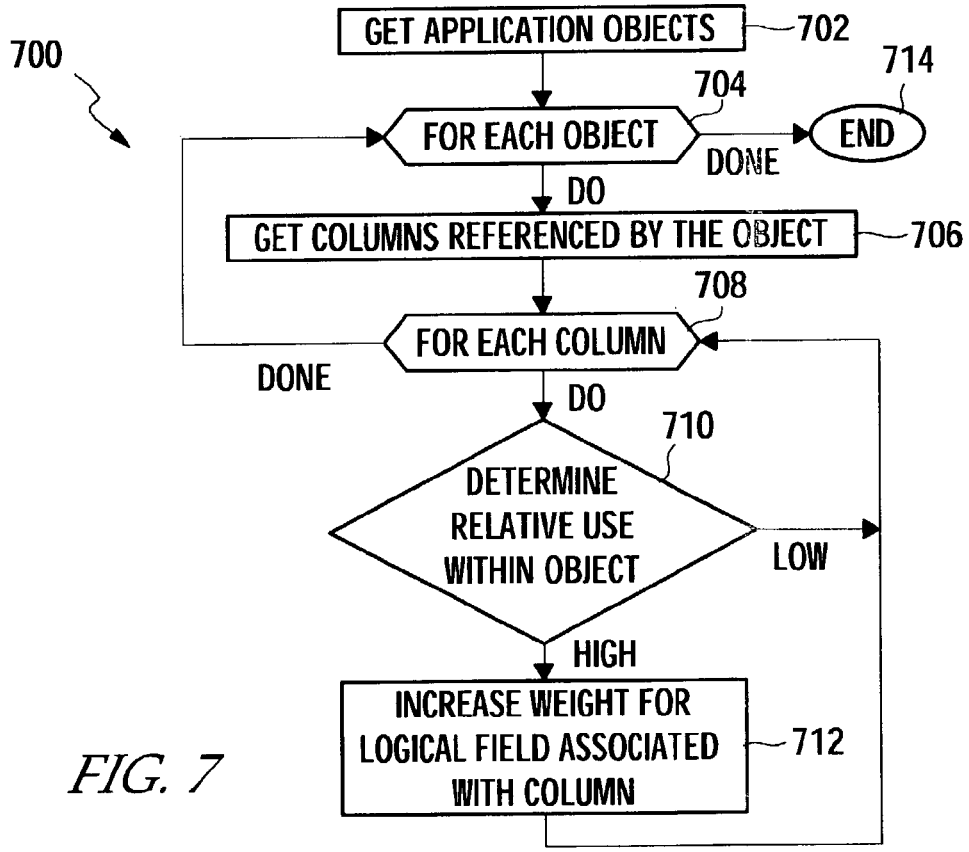
FIG. 7 is a flow chart illustrating exemplary operations for collecting information regarding logical field candidates from application objects according to aspects of the present invention.

FIG. 7 illustrates exemplary operations 700 for collecting usage information based on the application objects 226. As illustrated, the operations 700 extract column usage information from the application objects 226 in a similar manner as the operations 600 extract column usage information from the indexes 224. In other words, the operations 702–712 are similar to the corresponding operations 602–612 described above with reference to FIG. 6. Accordingly, a determination of the relative use of each column within an application object (step 710) may be determined in a similar manner as described above, for example, based on a total number and/or types of references to the column within the application objects.

It should be noted again, however, that since a column may be referenced by more than one application object 226, the increasing operation of step 712 may be additive. In other words, the weight for the logical field may be increased each time the relative use of the column within an application is determined to be high. Further, these increases are in addition to the increases in weights that occurred, in step 612, due to the relative use of the columns within the indexes, as determined in step 610. Once the weights have been adjusted for logical field candidates associated with columns referenced by each application object 226, the operations 700 are exited at step 714.

Figure 8:
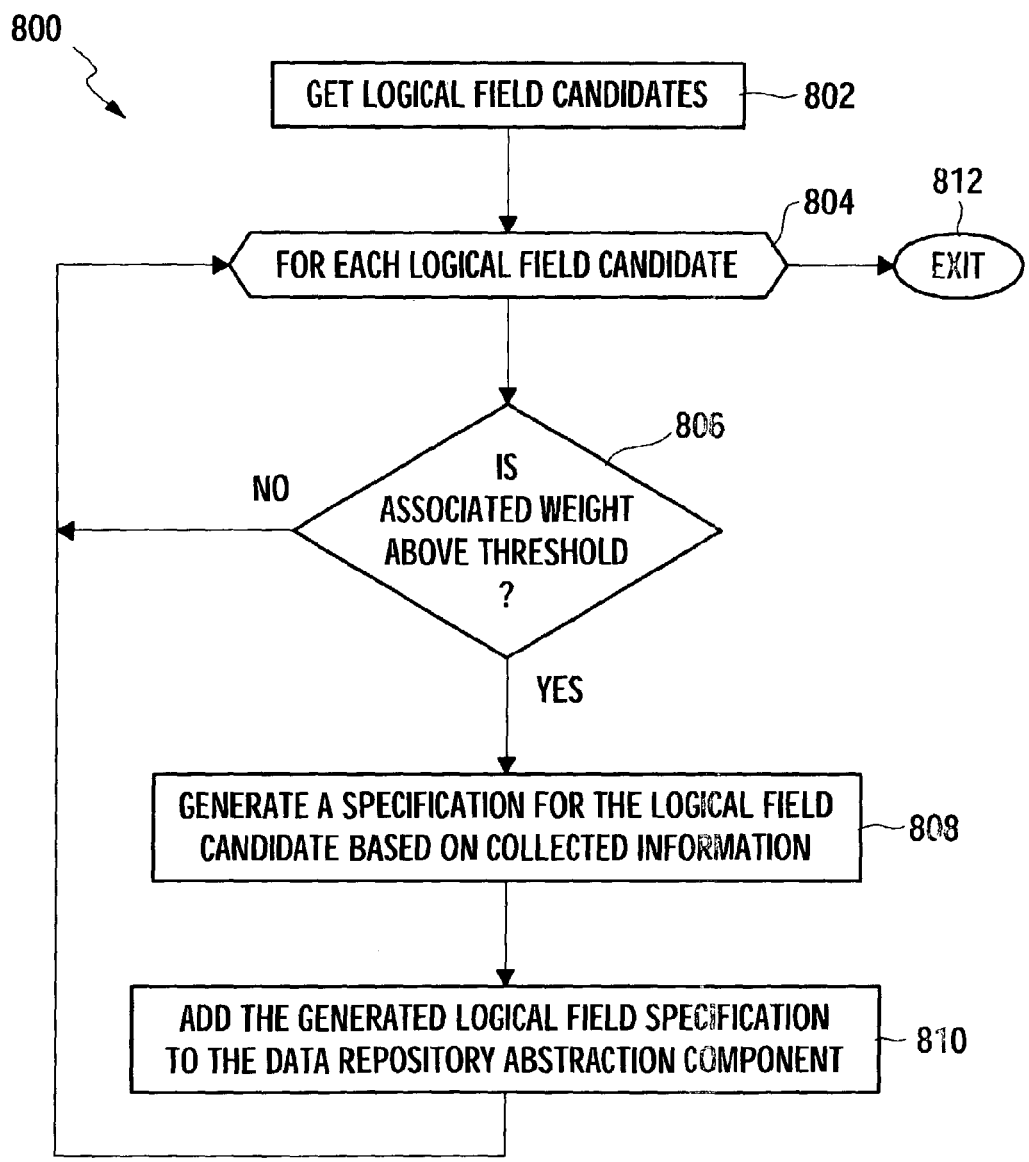
FIG. 8 is a flow chart illustrating exemplary operations for selecting, based on collected information, a subset of the possible logical field candidates to include in the generated data repository abstraction component according to aspects of the present invention.

Having adjusted the logical field weights according to the usage as indicated by the indexes (operations 600) and the application objects (operations 700), the DRA generator 131 may examine the adjusted weights to determine which logical field candidates to include when generating DRA component 132. FIG. 8 is a flow diagram of exemplary operations 800 for generating the DRA component 132 containing logical field specifications for a subset of the logical weight candidates, based on the adjusted weights.

The operations 800 begin at step 802, by getting a list of the logical field candidates. At step 804, a loop of operations (steps 806–810) is entered, to be performed for each logical field candidate, to determine if the logical field candidate should be included in the DRA component 132. At step 806, the weight associated with a selected logical field candidate is compared against a predetermined threshold value. If the associated weight exceeds the threshold value, at step 808, a logical field specification 208 is generated for the logical field candidate using the various collected usage and relational information. For example, the various collected information may be used to determine a data type to define in the logical field specification 208, as well as an access type, whether the field is searchable (queryable) or not, etc. At step 810, the generated logical field specification 208 is added to the DRA component 132.

On the other hand, if the associated weight does not exceed the threshold value, the selected logical field candidate is not included in the generated DRA component 132. Accordingly, the threshold value may be carefully selected in an effort to limit the number of logical field specifications 208, while still allowing popular (as determined by the collected usage information) physical fields to be represented by abstract logical fields 208 in the DRA component 132. Once the weight for each logical field candidate is examined, the operations 800 are exited at step 812.

AN ILLUSTRATIVE EXAMPLE

The exemplary operations of the DRA generator 131 for generating a DRA component 132 from available database schema and related objects may be further illustrated by way of a simple example. In the example, available database schema is shown in TABLE III, below, as an illustrative list of database tables and corresponding columns, primary and foreign keys. Related objects are shown in TABLE IV, below, as an illustrative index and an application object.

TABLE III

DBA GENERATION EXAMPLE (SAMPLE TABLES)

| | |
|---|---|
| 001 | Table:DEMOG |
| 002 | id INT |
| 003 | name CHAR(40) |
| 004 | addr CHAR(60) |
| 005 | (Primary Key id) |
| 006 | |
| 007 | Table:TEST |
| 008 | PatId INT |
| 009 | Dt INT |
| 010 | Ct INT |
| 011 | TestID INT |
| 012 | Result FLOAT |
| 013 | AttendingID INT |
| 014 | (Primary Key PatID, Dt, Ct) |
| 015 | |
| 016 | Table:TESTTYPE |
| 017 | id INT |
| 018 | Descr CHAR(40) |
| 019 | Department CHAR(20) |
| 020 | (Primary Key id) |
| 021 | |
| 022 | Table:PHYSICIAN |
| 023 | id INT |
| 024 | PhysName CHAR(60) |
| 025 | PhysPager CHAR(16) |
| 026 | (Primary Key id) |
| 027 | |
| 028 | Foreign Keys: |
| 029 |     TEST:PatId->DEMOG:id |
| 030 |     TEST:TestId->TESTTYPE:id |

As described above, in a "first pass" through the available information, the DRA generator 131 may perform the operations 500 of FIG. 5 to create a set of logical field candidates including every column in the four tables (DEMOG, TEST, TESTTYPE, and PHYSICIAN) shown above. Associated weights for each of the logical field candidates may also be generated and initialized (e.g., to zero). During this first pass, relationships between the PatID column of the TEST table and the id column of the DEMOG table, as well as between the TestId column of the TEST table and the id field of the TESTTYPE table may also be identified from the foreign keys (lines 0028–0030).

TABLE IV

DRA GENERATION EXAMPLE (SAMPLE INDEX AND OBJECT)

| | |
|---|---|
| 001 | Index over TEST::TestId, Result, PatId |
| 002 | |
| 003 | StoredProc:GetPatientCountPerPhys |
| 004 | For each Id in PHYSICIAN |
| 005 |   Select distinct(TESTTYPE.Descr) from TESTTYPE, TEST where |
| 006 |   TEST.AttendingID=Id and TESTTYPE.ID= TEST.TestId and |
| 007 |   Month(TEST.Dt)=CurrentMonth |
| 008 |   Output PhysName, CurrentMonth, Descr(s) |

During a second pass, the DRA generator 131 may perform the operations 600 of FIG. 6 to examine the index over TEST listed in TABLE IV (line 001). From this index, it may be determined that TestID field is often searched (making it a good candidate for a searchable logical field) and the Result and PatId fields are often returned. This information may be combined with the previously determined relationship between PatId field of the TEST table and the id field of the DEMOG table to infer that a join to DEMOG may occur and that, therefore, columns in DEMOG may also be returned.

During a third pass, the DRA generator 131 may perform the operations 700 of FIG. 7 to examine the GetPatientCountPerPhys stored procedure shown in lines 003–008 of TABLE IV. From the examination, a relationship between PHYSICIAN:Id and TEST:AttendingId may be identified. It may also be identified, from their inclusion as output, that TESTTYPE:Descr and PHYSICIAN:Name fields should be returnable fields. Recalling that weights for a logical field candidate may be increased for each pass, even though a relationship between TESTTYPE:Id and TEST:TestId was established in the first pass resulting in an initial increase in corresponding weights, the weights may be increased again with the additional finding of a relationship in the stored procedure (line 006).

On the other hand, weights corresponding to certain other columns may have a zero weighting. For example, columns, such as TESTTYPE:Dept and TEST:Ct would have a zero weighting due to their lack of use based on the information collected in the various passes (these columns are not referenced in any indexes, foreign keys, or application objects). Accordingly, assuming a non-zero threshold weight, when the DRA generator 131 performs the operations 800 of FIG. 8 to generate the DRA component 132, logical field specifications 208 corresponding to TESTTYPE:Dept and TEST:Ct would not be added.

CONCLUSION

A data repository abstraction (DRA) component may include logical field specifications that map abstract logical fields to corresponding fields of data having a particular physical representation. The DRA component may be automatically generated by examination of existing database schema and related objects, thus facilitating the transition from a particular physical data model to an abstract data model. For some embodiments, a weighting algorithm may be utilized to determine relative use of logical field candidates to be included in the DRA component, in an effort to limit the number of logical fields presented to a user, thus facilitating the query building process.

While the foregoing is directed to embodiments of the present invention, other and further embodiments of the invention may be devised without departing from the basic scope thereof, and the scope thereof is determined by the claims that follow.

What is claimed is:

1. A computer implemented method for automatically generating abstract representations of one or more physical fields of a data source, the method comprising:
   collecting information regarding usage of the physical fields; and
   generating the abstract representations of selected ones of the physical fields based on the collected usage information, so that abstract representations are generated only for selective physical fields whose corresponding collected information satisfies predefined criteria;

wherein the abstract representations are logical fields each comprising a logical field name, at least one location attribute identifying a location of the respective physical field, and a reference to an access method describing a manner of exposing physical data contained in the respective physical field;

wherein collecting information regarding usage of the physical fields comprises gathering information regarding at least one of an index, a foreign key, and an application object;

wherein collecting information regarding usage of the physical fields comprises gathering information regarding data repository schema; and wherein generating the abstract representations further comprises generating a list of logical field candidates based on the gathered information regarding data repository schema.

2. The method of claim 1, wherein generating the abstract representations further comprises:

generating usage parameters for tracking relative usage of the logical field candidates;

adjusting the usage parameters based on the collected information regarding usage of the physical fields; and generating abstract representations for a limited subset of the logical field candidates, the limited subset determined by the adjusted usage parameters.

3. A computer implemented method for automatically generating a data repository abstraction component describing, and used to access, physical data in a data repository, the method comprising:

collecting information regarding a schema of the data repository;

generating a list of logical field candidates for potential use in the data repository abstraction component based on the collected schema information, the logical field candidates having a set of corresponding weights;

collecting information regarding usage of the physical data;

adjusting the weights according to the collected information regarding usage of the physical data;

adding to the data repository abstraction component definitions for those logical field candidates having corresponding weights above a predetermined threshold value, whereby definitions for logical field candidates are selectively added to the data repository abstraction component; and wherein the definitions of the data repository abstraction each comprises a logical field name and information describing a manner of accessing a respective physical field of the physical data;

wherein:

the data repository is a relational database;

collecting information regarding the schema of the data repository comprises collecting a list of tables and corresponding columns; and the list of logical field candidates comprises a logical field candidate for each column.

4. The method of claim 3, wherein collecting information regarding usage of the physical data comprises collecting information from a set of one or more objects including at least one of an index, a foreign key, and an application object.

5. The method of claim 4, wherein adjusting the weights according to the collected information regarding usage of the physical data comprises increasing weights corresponding to logical field candidates referenced by the set of one or more objects.

6. The method of claim 3, further comprising determining, from the collected information regarding usage of the physical data, whether a logical field candidate should be searchable by a query.

7. The method of claim 3, further comprising determining, from the collected information regarding usage of the physical data, whether physical data associated with a logical field candidate should be returnable as results from a query.

8. A computer readable medium containing a program which, when executed, performs operations for automatically generating a data repository abstraction component describing, and used to access, physical data in a data repository, the operations comprising:

collecting information regarding the physical data and usage of the physical data;

generating the data repository abstraction component based on the collected information, wherein generating the data repository abstraction component comprises selectively adding to the data repository abstraction component logical field definitions only for selective physical data whose corresponding collected information satisfies predefined criteria; wherein each logical field definition comprises a logical field name and information describing a manner of accessing a respective physical field of the physical data;

wherein collecting information regarding the physical data comprises gathering information regarding a schema of the data repository;

wherein:

the data repository is a relational database;

collecting information regarding the schema of the data repository comprises collecting a list of tables and corresponding columns; and the list of logical field candidates comprises a logical field candidate for each column.

9. The computer readable medium of claim 8, wherein collecting information regarding usage of the physical data comprises gathering information from one or more objects including at least one of an index, a foreign key, and an application object.

10. The computer readable medium of claim 9, wherein the operations further comprise adjusting a set of weights corresponding to the logical field candidates based on the collected information regarding usage of the physical data.

11. The computer readable medium of claim 10, wherein adjusting the set of weights comprises increasing weights corresponding to logical fields candidates referenced from the one or more objects.

12. The computer readable medium of claim 11, wherein adding definitions to the data repository abstraction component comprises adding those definitions for logical fields having corresponding weights above a predetermined threshold value.

13. A data processing system, comprising:

a processor;

a repository of physical data;

metadata regarding a schema of the repository of physical data;

one or more objects including at least one of an index and an application object; and a data repository abstraction generator which, when executed by the processor, is configured to generate a data repository abstraction component describing, and used to access, the physical data in the data repository based on the metadata and information collected from the one or more objects; wherein generating the data repository abstraction component comprises selectively populating the data repository abstraction component with logical field definitions only for selective physical data whose corresponding collected information satisfies predefined criteria; wherein each logical field definition comprises a logical field name and information describing a manner of accessing a respective physical field of the physical data;

wherein data repository abstraction generator is configured to generate a list of logical field candidates, based on the metadata, for use in the data repository abstraction component; and wherein the repository of data comprises a relational database having one or more tables and associated columns, and the generated list of logical field candidates includes a logical field candidate for each of the columns.

14. The data processing system of claim 13, wherein the list of logical field candidates has a set of corresponding weights and the data repository abstraction generator is configured to adjust the weights based on usage information collected from the one or more objects.

15. The data processing system of claim 14, wherein the data repository abstraction generator is configured to adjust the weights according to the collected information regarding usage of the physical data by increasing weights corresponding to logical field candidates referenced by the set of one or more objects.

16. The data processing system of claim 13, wherein the data abstraction generator is configured to determine, based on the one or more objects, whether a logical field candidate is to be searchable by a query.

17. The data processing system of claim 13, wherein the data abstraction generator is configured to determine, based on the one or more objects, whether physical data associated with a logical field candidate should be returnable as results from a query.

* * * * *